June 30, 1959 C. R. GOODYEAR 2,892,622
CARBURETOR ASSEMBLY
Filed Jan. 23, 1956 5 Sheets-Sheet 1
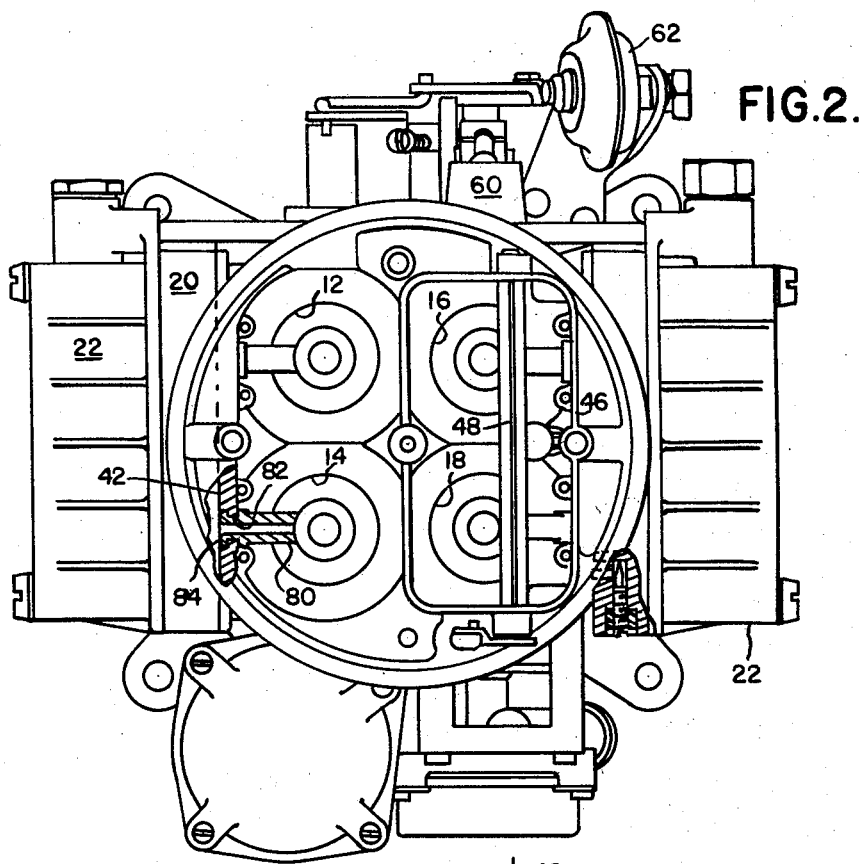
FIG.2.
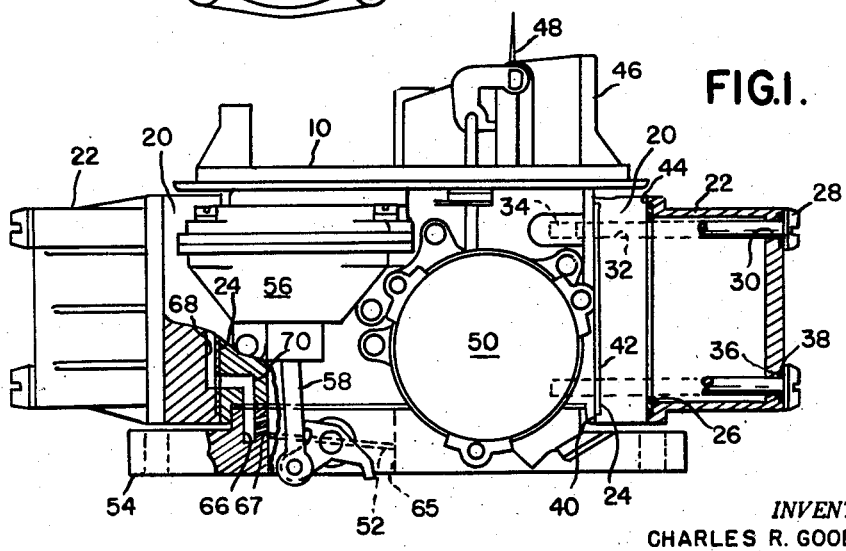
FIG.I.
INVENTOR.
CHARLES R. GOODYEAR
BY Whittemore,
Hulbert & Belknap
ATTORNEYS June 30, 1959 C. R. GOODYEAR 2,892,622
CARBURETOR ASSEMBLY
Filed Jan. 23, 1956 5 Sheets-Sheet 2
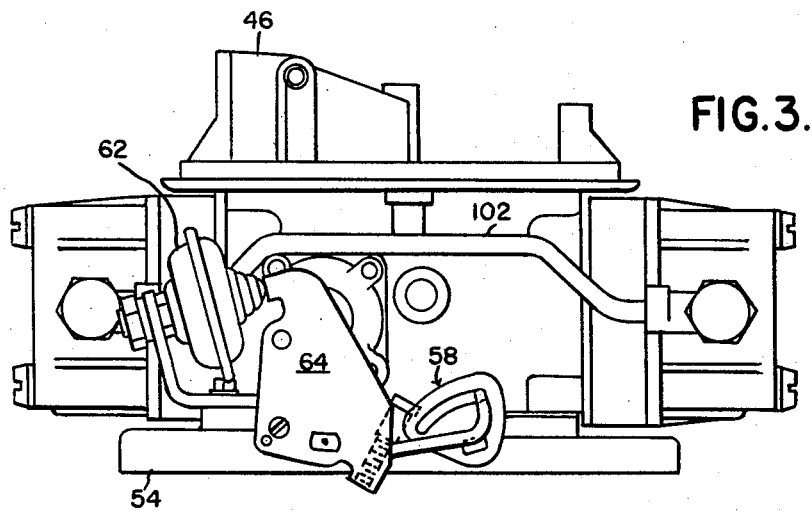
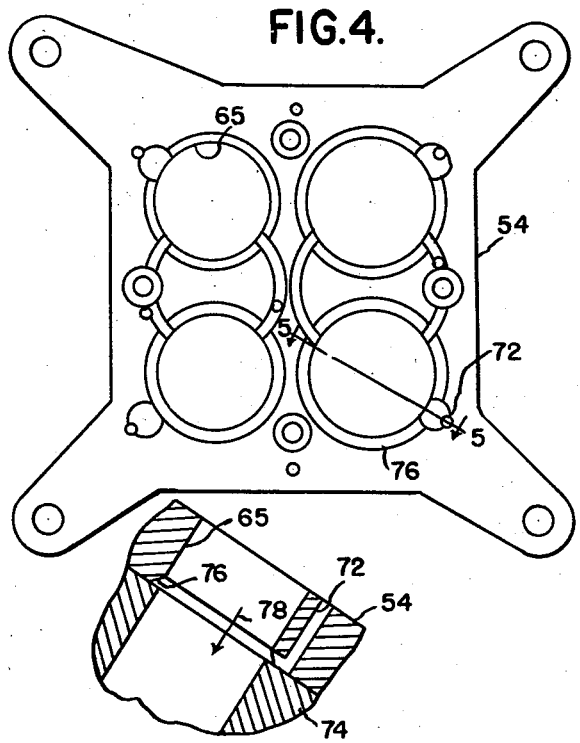
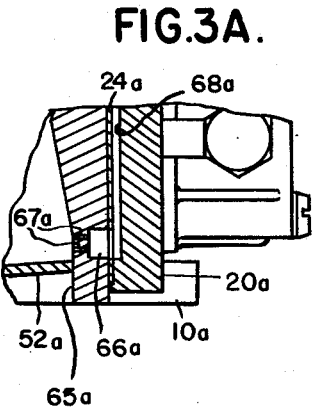
INVENTOR.
CHARLES R. GOODYEAR
BY
ATTORNEYS June 30, 1959  C. R. GOODYEAR  2,892,622
CARBURETOR ASSEMBLY
Filed Jan. 23, 1956  5 Sheets-Sheet 3

INVENTOR.
CHARLES R. GOODYEAR
BY Whittemore,
Hulbert & Belknap
ATTORNEYS

June 30, 1959  C. R. GOODYEAR  2,892,622
CARBURETOR ASSEMBLY
Filed Jan. 23, 1956  5 Sheets-Sheet 4

INVENTOR.
CHARLES R. GOODYEAR
BY Whittemore,
Hulbert & Belknap
ATTORNEYS

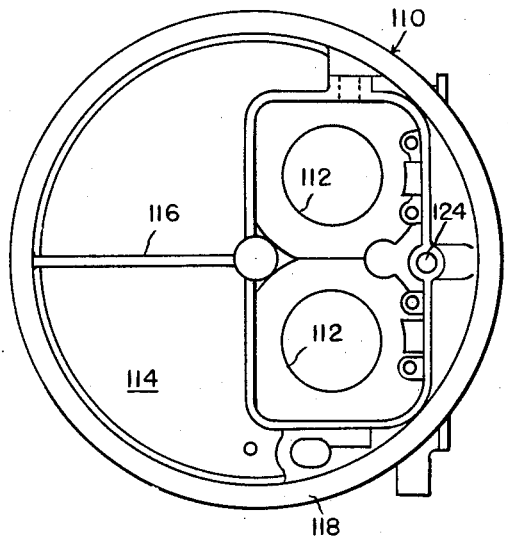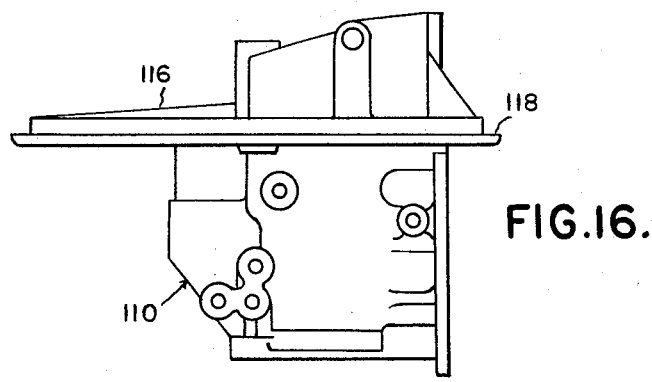

United States Patent Office 2,892,622
Patented June 30, 1959

2,892,622
CARBURETOR ASSEMBLY

Charles R. Goodyear, Detroit, Mich., assignor to Holley Carburetor Company, Van Dyke, Mich., a corporation of Michigan Application January 23, 1956, Serial No. 560,790

15 Claims. (Cl. 261—41)

The present invention relates to a carburetor assembly.

It is an object of the present invention to provide a carburetor assembly comprising a number of separate elements or components which may be assembled together in different relationships to produce different final carburetor assemblies.

More specifically, it is an object of the present invention to provide carburetor components comprising a main body, a metering body, a fuel bowl, and in some cases a separate throttle body.

It is a further object of the present invention to provide a carburetor assembly as described in the preceding paragraph in which fuel and/or air passages are provided extending through said metering body and affording a communication between the interior of said fuel bowl and the barrel of said main body.

It is a further object of the present invention to provide, for assembly into different carburetor combinations, main bodies which have two or four barrels therein, identical metering bodies adapted to be assembled with either the two-barrel or the four-barrel main bodies, and fuel bowls adapted to be attached to said metering bodies.

It is a further object of the present invention to provide in a carburetor assembly, a separate metering body provided with a flat surface having passages opening into said surface and having channels extending along said surface, said metering body being adapted to be assembled to a flat surface on the main body of a carburetor with an apertured gasket therebetween, the gasket closing the sides of said channels to produce elongated passages, and the openings therethrough providing communication between passages in said metering body and passages provided in the main body.

It is a further object of the present invention to provide a carburetor comprising a main body, a metering body attached to one side of said main body, and a fuel bowl attached to the outer side of said metering body, and insulation interposed between said metering body and said main body and fuel bowl to reduce the transfer of heat from said main body to said metering body and from said metering body to said bowl.

It is a further object of the present invention to provide in combination a carburetor having a main body provided with an enlarged opening forming a barrel for the induction of air and fuel into an internal combustion engine, a throttle body adapted to be attached to one end of said main body, said throttle body having an enlarged opening in alignment with the opening through said main body, means forming an annular channel at the juncture between said throttle body and a manifold, and an idle fuel passage opening into said channel.

It is a further object of the present invention to provide in a carburetor an idle fuel passage, needle valve means controlling flow of fuel through said idle passage, said needle valve means comprising a threaded opening communicating with said idle passage, an enlarged counterbore at the outer end of said threaded opening, a threaded valve needle in said threaded opening, and an annular resilient grommet in said counterbore having an internal diameter smaller than the minor thread diameter of said threaded opening.

Other objects and features of the invention will become apparent as the description proceeds, especially when taken in conjunction with the accompanying drawings, wherein:

Figure 1 is a front elevational view of a carburetor assembly, with parts broken away.

Figure 2 is a plan view of the carburetor assembly of Figure 1, with parts broken away.

Figure 3 is a rear elevational view of the carburetor.

Figure 3A is a fragmentary rear elevational view showing a modification of the present invention.

Figure 4 is a plan view of a throttle body employed in the present invention.

Figure 5 is a fragmentary sectional view taken on the line 5—5, Figure 4, showing the relationship between the throttle body and the lower surface of the main body of the carburetor assembly.

Figure 16 is a front elevational view of a different form of main body adapted to cooperate with the same metering bodies and fuel bowls.

Figure 17 is a plan view of the main body shown in Figure 16.

Figure 7:
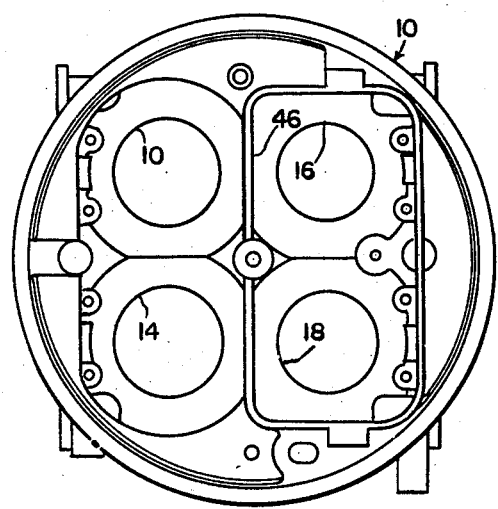
Figure 7 is a plan view of the main body.

Described in general terms, the present carburetor is characterized in that it is built up from a number of components. One or some of the corresponding components may take different forms whereas the remaining components are identical, so that different overall assemblies and combinations may be constructed from the components. More specifically, the components include a main body which may be provided either with two barrels or with four barrels. In either case the main body is assembled together with one or more metering bodies, which are identical with the two-barrel or four-barrel combinations, and with one or two fuel bowls which also are identical whether used with the two-barrel or four-barrel combinations. In addition, the components may include separate throttle bodies adapted for use with the two-barrel or four-barrel main bodies. If preferred the throttle bodies may be omitted and the throttles provided as elements in the main bodies.

The present construction thus permits the assembly of two-barrel and four-barrel carburetors from components in which the metering bodies and the fuel bowls are identical. This reduces the number of different parts which have to be provided and carried in stock, and consequently represents an economy both in initial manufacture and in repair and replacement of carburetors.

The present carburetor is also characterized in its low silhouette which permits it to be placed in its most efficient position atop the internal combustion engine of an automobile without requiring excessive hood height.

The present design of carburetor further increases efficiency in production since difficult machining operations heretofore required to provide the small air and/or fuel passages is simplified since for the most part these passages may be provided by drilling or channeling in the metering body.

By employing a separate metering body, the difficulties previously encountered in thermal percolation are largely avoided. This is because the passages in which thermal percolation has been a problem may be provided in the metering body, and the metering body may be efficiently thermally insulated from the main body.

Another advantage in the present construction is that some passages which in prior constructions required intersecting straight drilled passages, may be provided so as to extend along a flat side of the metering body by forming a channel therein adapted to be closed laterally in the assembly. With this arrangement the passage may be given any desired contour, including a curved contour avoiding the difficulties inherent in right angled intersection between drilled passages.

The carburetor shown in assembly in Figures 1–3 comprises the main body 10 having four vertically extending relatively large passages 12, 14, 16 and 18 providing barrels for the passage of air and the admixture of air with fuel, and for supplying this mixture to the manifold of an internal combustion engine. Attached to opposite sides of the main body 10 are metering bodies 20 which are of identical construction as will subsequently be described in detail. Assembled against the outer sides of the metering bodies 20 are two identical fuel bowls 22. Intermediate the metering bodies 20 and the main body 10 are thermally insulating and sealing gaskets 24. Intermediate the outer surface of the metering bodies 20 and the edge flanges of the fuel bowls 22 are thermally insulating and sealing gaskets 26. The assembly of gaskets, metering bodies and fuel bowls are firmly clamped together by assembly screws 28 which extend through openings 30 formed in the outer walls of the fuel bowls 22 and through openings indicated at 32 extending through the metering bodies. Suitably tapped openings 34 are provided at the sides of the main body 10 for the reception of the threaded ends of the assembly screws 28. Further, to reduce transfer of heat by conduction to the fuel bowls 22, recessed seats 36 are provided in the outer surface of the fuel bowls 22 and receive thermally insulating material 38 contacting the inner surface of the heads of the screws. The inner surfaces of the metering bodies 20 are provided with narrow continuous flanges 40 adapted to bear against the flat surface 42 provided at opposite sides of the main body 10. The flange 40 provides a metal-to-metal contact between the metering bodies 20 and the flat surface 42 of the main body 10 but the area is extremely small so that only negligible heat conduction may occur. Located within the continuous flange 40 is the gasket 24 which has previously been referred to. This gasket is preferably formed of compression gasketing material composed essentially of cork and rubber. The material for example, may be provided with a thickness substantially twice the thickness which it is forced to occupy when the metering body 20 is brought into metal-to-metal contact against the flat side surface of the main body 10. Excellent results have been obtained when the gaskets are provided with an initial thickness of approximately .06 inch and are compressed in use to about .03 inch.

The fuel bowls 22 are entirely open at the side which is assembled against the outer flat side surface of the metering bodies 20 and this open side of the fuel bowls is provided with continuous flanges 44 which are adapted to engage in metal-to-metal contact with the outer surface of the metering bodies 20. However, the area of contact between the flanges and the metering bodies is extremely small and only negligible heat conduction can occur. The flanges 44 limit inward movement of the fuel bowls against the metering bodies and hence, limit compression applied to the gaskets 26. These gaskets, like the gaskets 24, may be compression gasketing formed of cork and rubber and designed to be compressed in assembly to approximately one-half their initial thickness.

It will be understood that the present invention is concerned with overall assembly of the carburetor and not so much with details thereof, which for the most part may be provided in a conventional manner. Thus, in the assembly best illustrated in Figures 1–3 the main body includes an upwardly extending collar 46 in which a choke valve 48 is pivotally mounted, and conventional automatic choke mechanism may be provided, the actuating mechanism being included in the choke housing 50.

The four-barrel carburetor being described includes means for actuating the secondary throttles 52 which as shown in Figure 1, may be provided in a separate throttle body 54, and means for actuating the secondary throttles are provided including a diaphragm housing indicated at 56, and suitable linkage 58.

As best seen in Figure 3, lost motion linkage mechanism indicated geenrally at 58 is provided interconnecting the primary and secondary throttles so as to prevent opening of the secondary throttles until the primary throttles have reached a predetermined degree of opening, and likewise, to assure mechanical closure of said secondary throttles in conjunction with closure of said primary throttles.

The usual cam actuated accelerating pump is indicated at 60, and a dashpot 62 is provided for coaction with the lever 64 connected to the primary throttle.

Referring particularly to Figure 1, the throttle body 54 is illustrated as having an opening 65 therein in alignment with a corresponding opening forming a barrel of the main body 20. In this figure the throttle plate 52 is illustrated in closed position. Extending downwardly into the upper surface of the throttle body 54 is a recess 66 to which extend idle transfer holes 67. The inner face of the metering body 20 is provided with a channel 68 which is closed at its inner side by the gasket 24 to form an elongated channel. The channel thus provided is connected by intersecting passages 70 formed in the main body 20 to the recess 66. It will be appreciated of course that the passage 68 communicates with a suitable well in communication with the fuel bowl of the carburetor. In this case it may be stated that no attempt is made to trace all of the passages provided in the carburetor since these may be varied as desired to obtain conventional or novel carburetor functions. The present invention has as a principal advantage thereof the facilitating of providing such passages where desired or required in the easiest and most economical fashion.

Referring now to Figure 3A there is illustrated a somewhat different embodiment of the present invention. In this case no separate throttle body such as indicated at 54 in Figure 1 is provided. Instead, the throttle plate 52a is provided at the appropriate end of the barrel 65a of the main body 10a. In this case a recess 66a is provided in the outer surface of the main body 10a and connected by idle transfer holes 67a to the interior of the barrel. At the inner surface of the metering body 20a is provided a channel 68a adapted to be closed at its side by the gasket 24a and which thus provides an elongated channel for supplying idle fuel to the recess 66a and thence to the idle transfer holes 67a.

Referring now to Figures 4 and 5 there is illustrated an improved construction afforded by the present arrangement in the supply of idle fuel to the engine. In this case the throttle body 54 is shown as provided with the four enlarged openings 65 adapted to communicate with the lower or appropriate end of the barrels provided in the main body. The throttle body 54 is provided with an idle fuel supply passage 72 adapted to communicate with an appropriate idle fuel supply passage leading to the under surface of the main body 10. The throttle body 54 is adapted to be mounted upon the upper flat surface of the engine manifold 74. In order to provide an improved idle mixture, the lower end of the passage 65 in the throttle body 54 is beveled as indicated at 76. As herein illustrated, the bevel is conical and has a cone angle of approximately 90 degrees. It will be appreciated that as viewed in Figure 5, the air flow is in the direction of the arrow 78. The conical bevel 76 therefore provides an annular channel which is in communication with the idle fuel supply passage 72. With the throttle closed or substantially closed under curb idle conditions, the high vacuum existing below the throttle draws fuel through the idle fuel supply passage 72. The provision of the complete annular channel formed by the conical bevel 76 has the result of causing the fuel to flow around the channel and to be drawn into the air stream throughout an annular zone rather than at one point at the side of the barrel.

The barrels of the carburetor are of course provided with the usual venturis and include nozzles located adjacent the throats of the venturis.

Referring now to Figure 2 there is illustrated an arrangement in which the nozzles 80 have reduced portions inserted in externally counterbored openings 82 provided in the side walls of the main body 10, the outwardly extending reduced end of the nozzles being spun in place as indicated at 84. It will be observed of course that the spun end portion of the nozzle does not extend beyond the flat surface 42 at the side of the main body and that the passage therethrough may communicate with an appropriately placed main fuel supply passage provided in the metering body 20.

Figure 6:
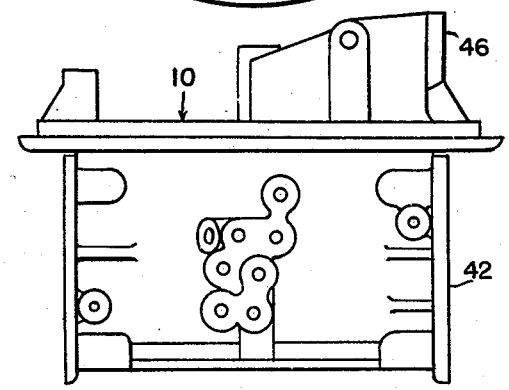
Figure 6 is a front elevational view of the main body of the carburetor assembly.
Figure 8:
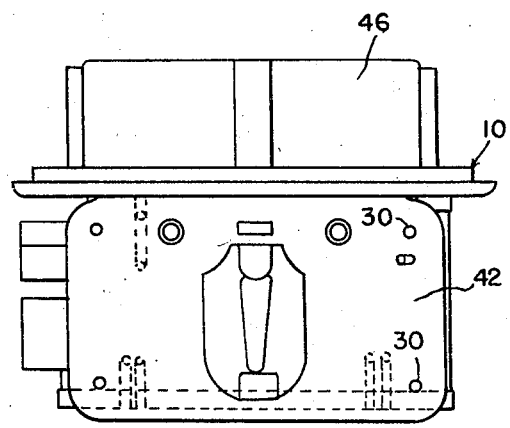
Figure 8 is a side elevational view looking from the right in Figure 6.

Referring now to Figures 6-8 there are illustrated different views of the main body 10 of the four-barrel carburetor with parts previously referred to identified by appropriate reference numerals.

Figure 11:
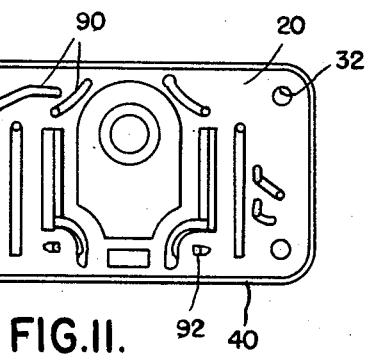
Figure 11 is an inside elevational view looking at the side of the metering body located adjacent the main body.
Figure 9:
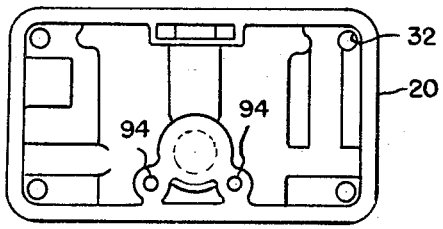
Figure 9 is a side elevational view of the metering body as viewed from the outside or the side located away from the main body in the assembly.

In Figures 9-12 there are shown details of a typical metering body 20. The surface of the metering body seen in Figure 11 is the surface which is adjacent the main body 10 of the carburetor. The openings 32 which receive the assembly screws 28 are clearly illustrated. In addition, a plurality of channels indicated generally at 90, and passages drilled into the body for communication with other passages as indicated generally at 92 are provided. The surface of the metering body 20 which is exposed within the interior of the fuel bowl 22 is seen in Figure 9. At this side of the metering body are provided openings 94 communicating with the interior of the fuel wells, one of which is seen at 96 in Figure 12.

Figure 13:
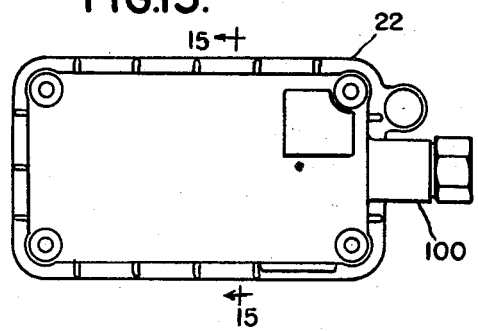
Figure 13 is an outside elevational view of the fuel bowl.
Figure 14:
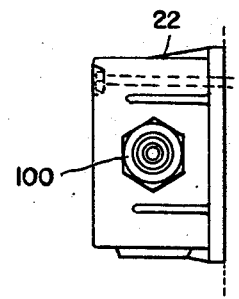
Figure 14 is an end elevation of the fuel bowl.
Figure 15:
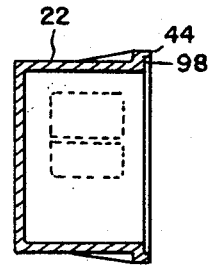
Figure 15 is a sectional view on the line 15—15, Figure 13.
Figure 10:
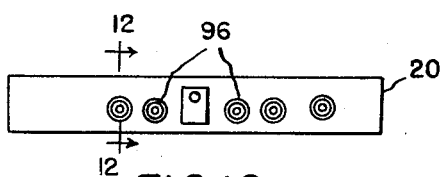
Figure 10 is a plan view of the metering body.
Figure 12:
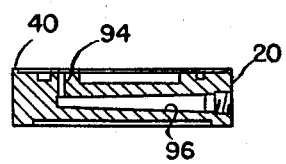
Figure 12 is a section on the line 12—12, Figure 10.

Referring now to Figures 13-15 there is illustrated the fuel bowl which as best seen in Figure 15, is completely open at one side and has the narrow abutment flange 44 surrounding a recessed seat 98 which is adapted to receive the gasket 26. A fuel inlet connection 100 is provided at one end of the fuel bowl and as best illustrated in Figure 3, these inlet connections communicate with fuel supply conduits 102 which lead to a conventional fuel pump or the like.

Referring now to Figures 16 and 17 there is illustrated a modified main body designated 110. The main body 110 is generally similar to the main body 10 except that it is provided only with two barrels 112. In the portion of the main body 110 which would otherwise be occupied by the remaining two barrels, there is provided a web 114 and a reinforcing rib 116. The two-barrel main body 110 is provided with the circular mounting flange 118 similar to a corresponding flange provided on the four-barrel main body for the purpose of receiving the lower end of an air cleaner.

While the drawings to which reference has been made show the parts, grooves, channels and/or drilled openings for the purpose of providing passages for the flow of fluid and/or air, it will be appreciated that the particular arrangement of these passages insofar as the present invention is concerned is immaterial. The invention relates to the provision of the component parts of the carburetor in such a way as to facilitate the provision of such channels and passages where desired or required. Furthermore, the present invention provides an arrangement in which either two or four-barrel carburetors may be assembled fom three or four basic components, of which the metering body and fuel bowls are identical for assembly with either the two-barrel or the four-barrel carburetors. The present invention further provides an arangement in which the assembled carburetor occupies a minimum of vertical height so that necessary clearance over the engine is reduced. Finally, the present invention provides a carburetor broken into components which are thermally insulated from each other, and particularly an arrangement in which the passages, chambers and recesses which are sensitive to thermal percolation are provided in a metering body which is thermally insulated from the main body of the carburetor.

The drawings and the foregoing specification constitute a description of the improved carburetor assembly in such full, clear, concise and exact terms as to enable any person skilled in the art to practice the invention, the scope of which is indicated by the appended claims.

What I claim as my invention is:

1. A carburetor comprising a main body having a barrel formed therein, a flat surface at one side thereof, a metering body having a flat surface assembled in spaced parallel relation with respect to the flat surface of said main body, a flat gasket interposed between said flat surfaces, said bodies having passages provided with openings at said surfaces, said surfaces having channels communicating with openings on said surfaces, said gasket having openings therethrough, the openings through said gasket communicating at both ends with one of the openings and channels at the flat surfaces of said bodies, said gasket closing the open side of said channels to form passages parallel to the flat surfaces of said bodies, and a fuel bowl having an open side assembled in sealed relation against the side of said metering body remote from said main body.

2. A carburetor as defined in claim 1 which comprises a sealing and heat insulating gasket between said metering body and bowl to minimize heat transfer to said bowl.

3. A carburetor as defined in claim 2, said main body having tapped holes, said metering body and bowl having screw receiving holes aligned with said tapped holes, and assembly screws in said holes pressing said bowl against said metering body and said metering body against said main body.

4. A carburetor as defined in claim 3 which comprises narrow peripheral flanges surrounding said gaskets and providing metal-to-metal contact between said metering body and said main body and bowl to limit compression of said gaskets.

5. A carburetor comprising a main body having a barrel formed therein, a flat surface at one side thereof, a metering body having a flat surface assembled in spaced parallel relation with respect to the flat surface of said main body, a flat gasket interposed between said flat surfaces, said bodies having passages provided with openings at said surfaces, said surfaces having channels communicating with openings on said surfaces, said gasket having openings therethrough, the openings through said gasket communicating at both ends with one of the openings and channels at the flat surfaces of said bodies, said gasket closing the open side of said channels to form passages parallel to the flat surfaces of said bodies, a fuel bowl having an open side assembled in sealed relation against the side of said metering body remote from said main body, and a throttle body having a large opening aligned with the barrel of said main body and assembled against one end of said main body, said throttle body having a pivoted throttle plate in the opening therein.

6. In a carburetor, a main body having a barrel formed by an opening extending therethrough from end to end, a separate throttle body having an enlarged opening in alignment with the barrel assembled in abutment against one end of said main body and adapted to be mounted over an opening in an engine manifold, a throttle pivotally mounted in the opening in said throttle body, the portion of the opening in the throttle body next adjacent said manifold being of larger size than the opening in the engine manifold to form an annular shoulder, and an idle fuel supply passage having a discharge port directly adjacent said shoulder.

7. A carburetor as defined in claim 6 in which the end portion of the opening through said throttle body is chamfered to form with the adjacent end surface of said manifold an annular channel.

8. An assembled carburetor comprising a main body having a barrel, a fuel nozzle in said barrel, and a main fuel supply passage in said main body connected to said nozzle; a metering body detachably connected to a side of said main body; a fuel bowl detachably connected to a side of said metering body; heat insulation interposed between said main body and said metering body, and between said metering body and said bowl; a well in said metering body, and passages in said metering body connecting said well to fuel in said bowl and to said main fuel supply passage in said main body, said heat insulation comprising compressible gaskets received between flat surfaces on said main and metering bodies, and said metering body and bowl, and rigid abutments limiting approach between said surfaces to limit compression of said gaskets.

9. A carburetor comprising a main body having a flat surface at one side thereof, fuel and air passages opening into said surface, a detachable metering body assembled against the said side of said main body, said metering body having a flat surface parallel to and spaced from said flat surface of said main body, said metering body having fuel and air passages opening into its flat surface in registration with the openings of corresponding passages in the flat surface of said main body, a flat gasket of heat insulating material compressed between said flat surfaces and having openings therethrough providing communication between corresponding passages in said bodies, and assembly means pressing said metering body against said main body.

10. A carburetor comprising a main body having a flat surface at one side thereof, fuel and air passages opening into said surface, a detachable metering body assembled against the said side of said main body, said metering body having a flat surface parallel to and spaced from said flat surface of said main body, said metering body having fuel and air passages opening into its flat surface in registration with the openings of corresponding passages in the flat surface of said main body, a flat gasket of heat insulating material compressed between said flat surfaces and having openings therethrough providing communication between corresponding passages in said bodies, and assembly means pressing said metering body against said main body, one of said bodies having a narrow abutment flange surrounding its flat surface and engaging the flat surface of the other body to limit compression of said gasket by said assembly means.

11. A carburetor assembly comprising a main body having a flat surface at one side thereof, a fuel passage opening into said flat side, a barrel passage extending vertically therethrough, and a nozzle in said barrel passage connected to said fuel passage; a fuel bowl having an open side surrounded by an edge surface occupying a plane; and a metering body having opposed flat side surfaces sandwiched between the flat side surface of said main body and the planar edge surface of said bowl, said metering body having passage means closing the open side of said bowl and extending therethrough and communicating with the fuel passage in said main body to supply fuel to said nozzle, and assembly members extending through openings in said bowl and metering body into said main body.

12. A carburetor assembly as defined in claim 11 in which the flat surface of said metering body adjacent said main body has open sided channels the open sides of which are closed by the adjacent surface of said main body to form passages.

13. A carburetor assembly as defined in claim 11 comprising thermal insulating means between said main body and said metering body, and between said metering body and said fuel bowl to provide double insulation between said main body and bowl.

14. A carburetor assembly comprising a main body having a flat vertical surface at one side thereof, a fuel passage opening into said flat side, a barrel passage extending vertically therethrough, and a nozzle in said barrel passage connected to said fuel passage; a fuel bowl having a side surface occupying a vertical plane; a relatively thin flat metering body having opposed flat vertical side surfaces sandwiched between the flat vertical side surface of said main body and the planar edge surface of said bowl, said metering body having passage means extending therethrough and communicating with the fuel passage in said main body to supply fuel from said bowl to said nozzle, and assembly members extending through openings in said bowl and metering body into said main body.

15. An assembled carburetor comprising a main body having a barrel, a fuel nozzle in said barrel, a flat vertical surface at one side of said main body, and a main fuel supply passage extending from said surface to said nozzle; a relatively thin flat metering body having opposed flat vertical side surfaces and detachably connected to the flat side surface of said main body; a fuel bowl having a flat side detachably connected to the flat side surface of said metering body opposite said main body, said bowl being open at its flat side, and said metering body constituting a closure for the open side of said bowl, and passage means including a well in said metering body to carry fuel from said bowl to said main fuel supply passage in said main body.

References Cited in the file of this patent
UNITED STATES PATENTS

| | | |
|---|---|---|
| 1,106,933 | Farley | Aug. 11, 1914 |
| 1,929,266 | Viel | Oct. 3, 1933 |
| 2,186,480 | Ensign | Jan. 9, 1940 |
| 2,201,603 | Wirth | May 21, 1940 |
| 2,214,273 | Fish | Sept. 10, 1940 |
| 2,316,882 | Moseley et al. | Apr. 20, 1943 |
| 2,361,227 | Mock | Oct. 24, 1944 |
| 2,376,228 | Brown | May 15, 1945 |
| 2,514,025 | Bush | July 4, 1950 |
| 2,596,681 | Hammon | May 13, 1952 |
| 2,609,188 | Brehob | Sept. 2, 1952 |
| 2,703,229 | Henning | Mar. 1, 1955 |
| 2,718,386 | Henning | Sept. 20, 1955 |
| 2,752,132 | Nye | June 26, 1956 |
| 2,801,835 | Read | Aug. 6, 1957 |